US011150070B2

(12) United States Patent
Guinart et al.

(10) Patent No.: US 11,150,070 B2
(45) Date of Patent: Oct. 19, 2021

(54) METHOD FOR ESTIMATING THE EXTERNAL RADIUS OF A TYRE FITTED TO A WHEEL OF A MOTOR VEHICLE

(71) Applicants: Continental Automotive France, Toulouse (FR); Continental Automotive GmbH, Hannover (DE)

(72) Inventors: Nicolas Guinart, Toulouse (FR); Sébastien Plancke, Montauban (FR); Jean-Philippe Boisset, Toulouse (FR)

(73) Assignees: Continental Automotive France; Continental Automotive GmbH

( * ) Notice: Subject to any disclaimer, the term of this patent is extended or adjusted under 35 U.S.C. 154(b) by 0 days.

(21) Appl. No.: 17/264,391

(22) PCT Filed: Jul. 18, 2019

(86) PCT No.: PCT/EP2019/069392
§ 371 (c)(1),
(2) Date: Jan. 29, 2021

(87) PCT Pub. No.: WO2020/025342
PCT Pub. Date: Feb. 6, 2020

(65) Prior Publication Data
US 2021/0247171 A1 Aug. 12, 2021

(30) Foreign Application Priority Data

Jul. 30, 2018 (FR) ...................................... 1857076

(51) Int. Cl.
 *G01B 5/10* (2006.01)
 *G01P 1/00* (2006.01)
(Continued)

(52) U.S. Cl.
CPC ............ *G01B 5/10* (2013.01); *B60C 23/0489* (2013.01); *G01P 1/00* (2013.01); *G01P 15/09* (2013.01); *B60C 11/246* (2013.01)

(58) Field of Classification Search
CPC ..... G01B 5/10; B60C 23/0489; B60C 11/246; G01P 1/00; G01P 15/09
See application file for complete search history.

(56) References Cited

U.S. PATENT DOCUMENTS

2003/0192375 A1 10/2003 Sugai et al.
2004/0225423 A1 11/2004 Carlson et al.
(Continued)

OTHER PUBLICATIONS

English Translation of the Written Opinion for International Application No. PCT/EP2019/069392, dated Oct. 14, 2019, 6 pages.
(Continued)

*Primary Examiner* — Tarun Sinha
(74) *Attorney, Agent, or Firm* — RatnerPrestia

(57) ABSTRACT

A method for estimating the external radius $R_e$ of a tire fitted to a wheel of a motor vehicle, the wheel including a radial acceleration sensor. The method includes: acquiring, by the sensor, a signal S when the vehicle is in motion under non-steady-state conditions, detecting local extrema of the signal S which are respectively associated with phase values and with detection instants, determining a variation in frequency F' of rotation of the wheel as a function of said phase values and of said detection instants, determining, for at least one detection instant, a discrepancy between the local extremum associated with said detection instant and a reference signal obtained by eliminating the fluctuations in the signal S, determining a value for the longitudinal acceleration $V_{al}$ of the vehicle as a function of the at least one discrepancy, estimating the external radius $R_e$ as a function of $V_{al}$ and F'.

10 Claims, 3 Drawing Sheets

(51) Int. Cl.
    *B60C 23/04*     (2006.01)
    *G01P 15/09*     (2006.01)
    *B60C 11/24*     (2006.01)

(56) References Cited

U.S. PATENT DOCUMENTS

| | | | | |
|---|---|---|---|---|
| 2010/0010770 A1* | 1/2010 | Helck | ................... | G01P 15/00 |
| | | | | 702/141 |
| 2012/0319831 A1* | 12/2012 | Maehara | ............ | B60C 23/0488 |
| | | | | 340/447 |

OTHER PUBLICATIONS

International Search Report and Written Opinion for International Application No. PCT/EP2019/069392, dated Oct. 14, 2019, with partial English translation, 8 pages.

International Search Report and Written Opinion for International Application No. PCT/EP2019/069392, dated Oct. 14, 2019. 13 pages (French).

\* cited by examiner

METHOD FOR ESTIMATING THE EXTERNAL RADIUS OF A TYRE FITTED TO A WHEEL OF A MOTOR VEHICLE

CROSS REFERENCE TO RELATED APPLICATIONS

This application is the U.S. National Phase Application of PCT International Application No. PCT/EP2019/069392, filed Jul. 18, 2019, which claims priority to French Patent Application No. 1857076, filed Jul. 30, 2018, the contents of such applications being incorporated by reference herein.

FIELD OF THE INVENTION

The present invention relates to the field of the measurement of physical parameters pertaining to a wheel of a motor vehicle, such as a car for example. It relates more particularly to a method for estimating the external radius of a tire fitted to a wheel of a motor vehicle, and to a wheel unit configured for implementing such a method. One particularly advantageous, although nonlimiting, application of the present invention is to the monitoring of tire wear.

BACKGROUND OF THE INVENTION

In order to improve driving safety, the current regulations require each newly produced motor vehicle to be equipped with a system for monitoring various physical parameters so as to be able to detect a malfunctioning of one or more elements that make up said motor vehicle. The parameters measured are typically the radial acceleration of at least one wheel of the vehicle, and also the pressure, temperature and wear of the tire with which this wheel is equipped.

Conventionally, such a monitoring system comprises at least one electronic housing, also known as a "wheel unit", mounted on a wheel of the motor vehicle. For example, such a wheel unit collaborates fixedly with a valve of the rim with which the wheel is equipped. As a preference, each wheel of the vehicle is equipped with a wheel unit so as to monitor certain parameters across the entire vehicle.

The wheel unit comprises sensors dedicated respectively to measuring certain parameters, such as, for example, a TPMS (Tire Pressure Monitoring System) sensor, dedicated to measuring the pressure in the tire. In addition to these sensors, the wheel unit also comprises a microprocessor, a battery, a memory and a radiofrequency transmitter. To supplement the wheel unit, the monitoring system also comprises a central unit with which the vehicle is equipped and which comprises an electronic computer incorporating a radiofrequency receiver connected to an antenna, this being so as to receive signals transmitted by the wheel unit and, where appropriate, to transmit alerts for the intention of the driver of the vehicle.

The monitoring of the state of wear of a tire of a wheel is not itself performed by the wheel unit, but by one or more dedicated devices. It assumes great importance insofar as it has a direct influence on the roadholding of the vehicle, both during phases of usual and every-day driving, and during phases that occur more occasionally (aquaplaning, emergency braking, punctures, etc.). The need to monitor such wear is therefore required especially since this is a phenomenon that has a progressive and unavoidable influence on the tire.

One known device for monitoring tire wear is a detection unit designed to detect the acceleration to which a wear rod positioned in a groove of the tread of said tire is subjected. However, such a device has the disadvantage of providing an indication of wear only once said rod comes into contact with the ground, something which does not effectively occur until the tire wear has become sufficiently pronounced. In other words, this device is unable to monitor how tire wear evolves throughout the life-cycle of said tire.

More recent devices have been proposed to alleviate this problem and measure tire wear gradually. For example, tire wear indicators of different respective dimensions arranged in the tire and configured to emit characteristic acoustic signals when the wear reaches said indicators, have been employed. In another example, dedicated sensors arranged inside the tire itself have been used. These sensors notably seek to measure signals indicative of deformation of an internal surface of the tire, or else signals indicative of the slipping of the tire and of a coefficient of grip in said slipping.

Nevertheless, these currently embodied solutions are still far from constituting embodiment alternatives that are easy to implement. Specifically, they require the installation of devices in addition to the other sensors already present, particularly those that measure the radial acceleration of the wheels (and that are incorporated into the wheel units). This is in order to measure signals of different physical natures. It will therefore be appreciated that more electronics are required, thus adding to the complexity of the design of a wheel, and, ultimately, that of the monitoring system that needs to be capable of processing these various signals. This operational complexity also has a direct impact on the design cost.

It should also be noted that some of these current solutions seek to determine how geometric parameters of the tire (for example the thickness of the tire) evolve. Now, determining such geometric parameters on the basis of measurements from signals that are themselves related to the geometry of the tire, such as the deformation of the internal surface for example, leads to a lack of robustness and of precision in the results obtained. This is detrimental insofar as the precision with which such geometric parameters can be measured governs the precision with which it is possible to identify potential construction/assembly defects likely to affect driving safety, for example by comparing the thickness of the tire with the corresponding theoretical thickness already recorded in the wheel unit, an alert signal can be emitted to identify excessive or abnormal wear, or alternatively still, that the type of tire mounted on the wheel is incorrect. There is therefore still a need to determine the state of tire wear with great precision.

SUMMARY OF THE INVENTION

An aspect of the present invention aims to overcome all or some of the disadvantages of the prior art, particularly those set out hereinabove, by proposing a solution that makes it possible with great precision to determine the external radius of a tire fitted to a wheel of a motor vehicle, and to do so without taking direct measurements of geometric parameters of said tire. Such a solution also makes it possible to limit the electronic complexity of implementing a motor vehicle monitoring system. The design costs are therefore reduced. An aspect of the invention also seeks to propose a solution that provides a wheel unit configured to determine the external radius of the tire precisely.

To this end, and according to a first aspect, the invention relates to a method for estimating the external radius $R_e$ of a tire fitted to a wheel of a motor vehicle, said wheel comprising a radial acceleration sensor. Said method comprises the following steps:

an acquisition step of acquisition, by the radial acceleration sensor, of a signal S during a predetermined time window W when the vehicle is in motion under non-steady-state conditions, a detection step of detecting at least three local extrema of the signal S which are respectively associated with phase values and with detection instants, a determination step of determining, for the relevant time window W, a variation in frequency F' of rotation of the wheel of the vehicle as a function of said phase values and of said detection instants, a determination step of determining, for at least one detection instant, a discrepancy between the local extremum associated with said at least one detection instant and a reference signal obtained by eliminating the fluctuations in the signal S, so that said reference signal is indicative of the central acceleration of the wheel during said time window W, a determination step of determining a value for the longitudinal acceleration $V_{al}$ of the vehicle for the relevant time window W as a function of said at least one discrepancy, an estimation step of estimating said external radius $R_e$ as a function of said longitudinal acceleration value $V_{al}$ and of said variation in frequency F'.

In particular embodiments of the invention, the method for estimating the external radius $R_e$ may further comprise one or more of the following features, taken alone or in any technically possible combination.

In one particular embodiment, the step of determining the variation in frequency F' comprises determining a phase time signal φ by quadratic interpolation of the respective phase values of three local extrema, said variation in frequency F' being determined by evaluating the second derivative of said signal φ.

In one particular embodiment, the three local extrema considered within the time window W are consecutive.

In one particular embodiment, the signal S acquired is sampled at a predetermined frequency Fe, and said reference signal is obtained, during the step of determining the discrepancies, by linear regression of said samples of the signal S.

In one particular embodiment, a plurality of detection instants are considered during the step of determining the discrepancy, so as to obtain a plurality of discrepancies respectively associated with said detection instants, said longitudinal acceleration value $V_{al}$ being calculated using the formula:

$$V_{al} = \sqrt{\Delta M^2 - g^2}$$

where ΔM is a quantity indicative of a mean of the respective absolute values of said discrepancies, and g is the acceleration due to gravity.

In one particular embodiment, all the detection instants determined during the detection step are considered during the step of determining the discrepancies.

In one particular embodiment, the quantity ΔM is equal to the ratio between the arithmetic mean of said absolute values and an error $E_G$ in the gain of the radial acceleration sensor, said gain error $E_G$ being determined prior to the acquisition step during a phase of steady-state running of the vehicle.

In one particular embodiment, the external radius $R_e$ is calculated using the formula:

$$R_e = \frac{V_{al}}{2 \times \pi \times F'}$$

According to a second aspect, the present invention relates to a wheel unit comprising a radial acceleration sensor. Furthermore, said wheel unit comprises means configured to implement the steps of the estimation method according to an aspect of the invention.

According to a third aspect, the present invention relates to a motor vehicle comprising a wheel unit according to an aspect of the invention.

BRIEF DESCRIPTION OF THE DRAWINGS

An aspect of the invention will be better understood upon reading the following description, given by way of entirely nonlimiting example and with reference to FIGS. 1 to 4, in which.

In these figures, references that are identical from one figure to the next denote identical or analogous elements. For the sake of clarity, the elements shown are not to scale, unless indicated otherwise.

DETAILED DESCRIPTION OF THE PREFERRED EMBODIMENTS

An aspect of the present invention relates to the field of the measurement of the state of wear of a tire fitted to a wheel of a motor vehicle, such as a car for example.

For the remainder of the description, and as is conventional, the units of measurement for the radial acceleration of the wheel are m·s$^{-2}$.

Figure 1:
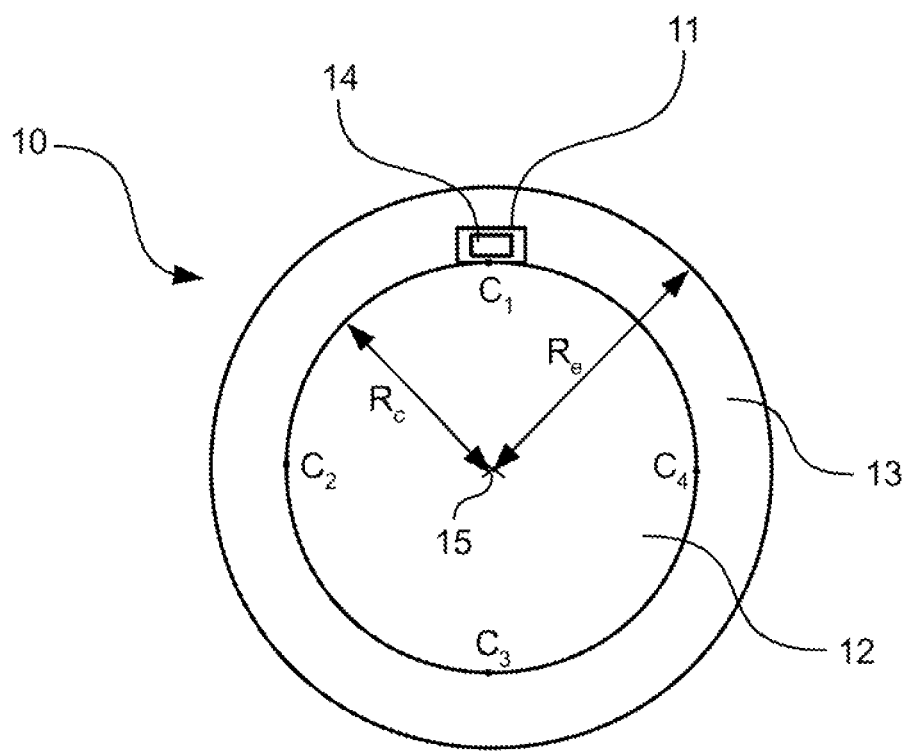
FIG. 1: is a schematic depiction of a wheel of a motor vehicle.

FIG. 1 schematically depicts a wheel 10 of a motor vehicle.

Said wheel 10 is configured to rotate about an axis of rotation 15. It is equipped with a rim 12 and with a tire 13 mounted on said rim 12. Said tire 16 comprises an internal surface collaborating with the rim 12, and an external surface, opposite to said internal surface, and intended to bear locally on the ground when the vehicle is in motion. In the known manner, said external surface corresponds to a tread comprising various elements for providing and maintaining grip between the vehicle and the road, such as grooves, stripes, blocks, etc.

The motor vehicle (not depicted in the figures) is equipped with a tire pressure monitoring system. Said monitoring system in the conventional way comprises a central electronic unit (not depicted in the figures) arranged inside the vehicle and, on each of the wheels of said vehicle, a wheel unit 11. Without this detracting from the generalized nature of an aspect of the invention, the next part of the description seeks more specifically to detail the operation of a single wheel unit 11, it being appreciated that the explanation given clearly applies, without distinction, to each wheel unit of the vehicle.

The next part of the description considers the configuration in which the wheel unit 11 is attached to the end of the valve of the rim 12 of the wheel 10, for example using a "snap-in" type of connection known to those skilled in the art and so that it is arranged inside the tire 13 with which the wheel 10 is equipped. However, there is nothing to prevent there being a wheel unit 11 attached to the valve of the rim 12 of the wheel 10 in a different way, for example secured by a nut and of "clamp-in" type, or else attached to the rim 12 of the wheel 10 directly, for example using a metal band known per se, by screw-fastening, by bonding, etc.

The wheel unit 11 comprises a radial acceleration sensor 14 configured to take measurements of the radial acceleration of the wheel 10. By way of entirely nonlimiting example, said radial acceleration sensor 14 is of the microelectromechanical system (also known as MEMS) type, for example a piezoelectric accelerometer known per se. However, there is nothing to prevent there being, in other examples not detailed here, a radial acceleration sensor 14 of some other known type.

Figure 2:
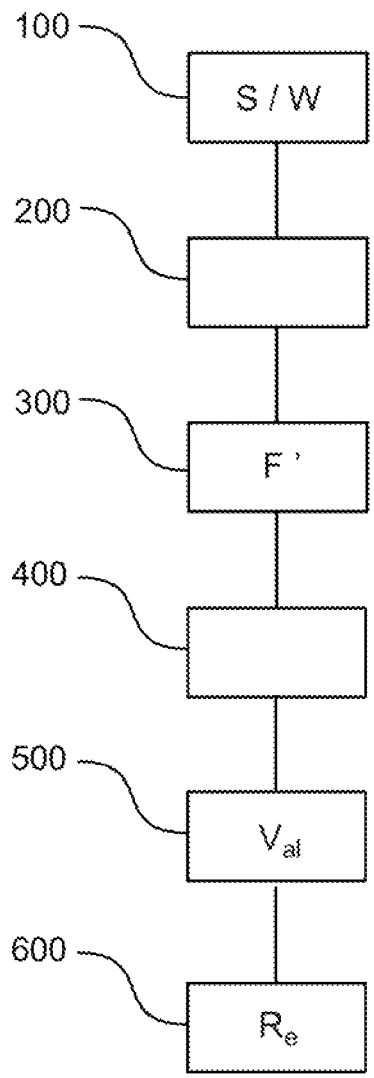
FIG. 2: is a flow diagram of one exemplary embodiment of a method for estimating the external radius $R_e$ of the tire of a wheel of a motor vehicle.

FIG. 2 is a flow diagram of one exemplary embodiment of a method for estimating the external radius $R_e$ of the tire 13 fitted to the wheel 10.

The expression "external radius $R_e$ of the tire 13" refers here to the radial distance between the axis of rotation 15 of the wheel 10 and the tread of the tire 13 when this tread is unladen, namely is not compressed in a contact patch in which the tire is in contact with the ground. Thus, the external radius $R_e$ considered in an aspect of the present invention corresponds, according to the terminology known to those skilled in the art, to the free static radius of the tire 13 rather than to the laden radius.

For the implementation of said method, the wheel unit 11 comprises, for example, a processing circuit (not depicted in the figures) comprising one or more processors and storage means (magnetic hard disk, electronic memory, optical disk, etc.) on which a computer program product is stored, in the form of a set of program code instructions to be executed in order to implement the various steps of the method for estimating the external radius $R_e$ of the tire 13. Alternatively, or in addition, the processing circuit of the wheel unit 11 comprises one or more programmable logic circuits (FGPA, PLD, etc.), and/or one or more specialized integrated circuits (ASIC), and/or a set of discrete electronic components, etc., suitable for implementing all or some of said steps of the method for estimating the external radius $R_e$ of the tire 13.

In other words, the processing circuit of the wheel unit 11 comprises a set of means which are configured in the form of software (specific computer program product) and/or hardware (FGPA, PLD, ASIC, discrete electronic components, etc.) to implement the steps of the method for estimating the external radius $R_e$ of the tire 13.

In one particular embodiment, and entirely nonlimitingly, the wheel unit 11 comprises, in addition to the memory storage means and a radial acceleration sensor 14, also a microprocessor, a battery and a radiofrequency transmitter, as well as temperature and pressure sensors respectively. As for the central unit of the monitoring system, this comprises an electronic computer incorporating a radiofrequency receiver connected to an antenna, this being so as to receive signals transmitted by the wheel unit 11 and, where appropriate, to transmit alerts for the intention of the driver of the vehicle. Typically, the central unit is configured to transmit alerts when the pressure of a tire 13 drops below a predetermined threshold, thus informing a user of the vehicle of the need to provide additional inflation, or even potentially to replace said tire 13.

The method for estimating the external radius $R_e$ of the tire 13 comprises several steps. In outline, said method consists first of all in obtaining measurements taken by said sensor 14 during a time window. A variation in the frequency of rotation of the wheel 10 and a value for the longitudinal acceleration of the vehicle are determined for said time window as a function of said measurements. After that, the external radius $R_e$ of the tire 13 is estimated as a function of said variation in frequency and of said longitudinal acceleration value. By comparison with the prior art, said method has the aim of allowing a more refined and more precise estimate of the external radius $R_e$ of the tire 13, the improvement in said estimate being conditional here on determining said variation in frequency and said longitudinal acceleration value precisely. As a result, the estimate of the external radius $R_e$ is obtained without the need to take direct measurements of other geometric parameters of said tire 13. The expression "other geometric parameters" refers here to intrinsic dimensional values of the tire 13 or else to dimensional values indicative of the relative position of the tire 13 with respect to the wheel 10 or any other element of the vehicle.

To this end, the method first of all comprises an acquisition step 100 of acquisition, by the radial acceleration sensor 14, of a signal S during a predetermined time window W when the vehicle is in motion under non-steady-state conditions.

In the conventional way, the radial acceleration sensor 14 acquires the signals in analog form. The next part of the description adopts the convention whereby the radial acceleration of the wheel 10 is measured according to a radial axis connecting the sensor 14 to the axis of rotation 15 of the wheel 10 and oriented centripetally. According to such a convention, and after projection onto said radial axis, it is known that a radial acceleration signal is, during the course of the time window W, the sum of three components:

a so-called "mean" component $\Delta M$ due to the centripetal force (also more generally referred to as "central" force when the direction in which it is oriented is disregarded) exerted on the radial acceleration sensor 14 and equal to:

$$R_c \times \omega^2,$$

where $R_c$ denotes the distance separating the axis of rotation 15 of the wheel 10 from the radial acceleration sensor 14, and ω denotes the angular velocity of the wheel 10 considered at the level of said radial acceleration sensor 14;

a so-called "gravitational" component $A_G$ due to the force of gravity exerted on the radial acceleration sensor 14 and equal to:

$$g \times \sin(\omega \times (t-t_0) + \varphi(t_0)),$$

where g represents the acceleration due to gravity, $t_0$ denotes a reference instant in the time window considered, and $\varphi(t_0)$ denotes the initial phase of the signal;

a so-called "longitudinal" component $A_L$ due to the thrust or braking force experienced by the vehicle as it travels, and equal to:

$$\Psi \times \sin(\omega \times (t-t_0) + \varphi(t_0)),$$

where ¥ denotes the amplitude of the thrust or braking force. Thus, when the vehicle is running at a steady speed, that is to say at constant speed, the longitudinal component $A_L$ is zero.

It should be noted that, as it moves, the wheel 10 of the vehicle may be subjected to vertical movements, that is to say movements oriented in the field of gravity, notably according to the condition of the road (bumps, potholes, etc.). This vertical movement is thus associated with a vertical acceleration component which is not, however, taken into consideration in the breakdown given above for the projection of the radial acceleration signal onto the radial axis. Specifically, because the condition of the road is not known in advance, it is not possible to model the corresponding vertical acceleration in a deterministic manner. Nevertheless, because the vertical movements caused by the condition of the road remain ephemeral, they therefore do not affect the validity of the results obtained hereinafter.

As the vehicle moves along, the wheel unit 11, and therefore ultimately the radial acceleration sensor 14, follows the movement of the wheel 10. Specifically, and as illustrated in FIG. 1, the wheel unit 11 will, during the course of a complete revolution of the wheel 10, notably occupy four distinct positions, referred to as extremal positions, and denoted $C_1$, $C_2$, $C_3$ and $C_4$. These respectively correspond to the top, left, bottom and right extreme positions. Thus, when the radial acceleration sensor 14 is in position $C_2$ or $C_4$, the amplitude of the longitudinal component $A_L$ is, in terms of absolute value and when the vehicle is indeed in the process of accelerating, at a maximum, whereas that of the gravitational component $A_G$ is zero. Conversely, when the radial acceleration sensor 14 is in position $C_1$ or $C_3$, the amplitude of the gravitational component $A_G$ is, in terms of absolute value, at a maximum, whereas that of the longitudinal component $A_L$ is zero. It will be appreciated therefore that the values of the radial acceleration fluctuate around the mean component $A_M$ according to the values respectively adopted by the gravitational component $A_G$ and the longitudinal component $A_L$.

Figure 3:
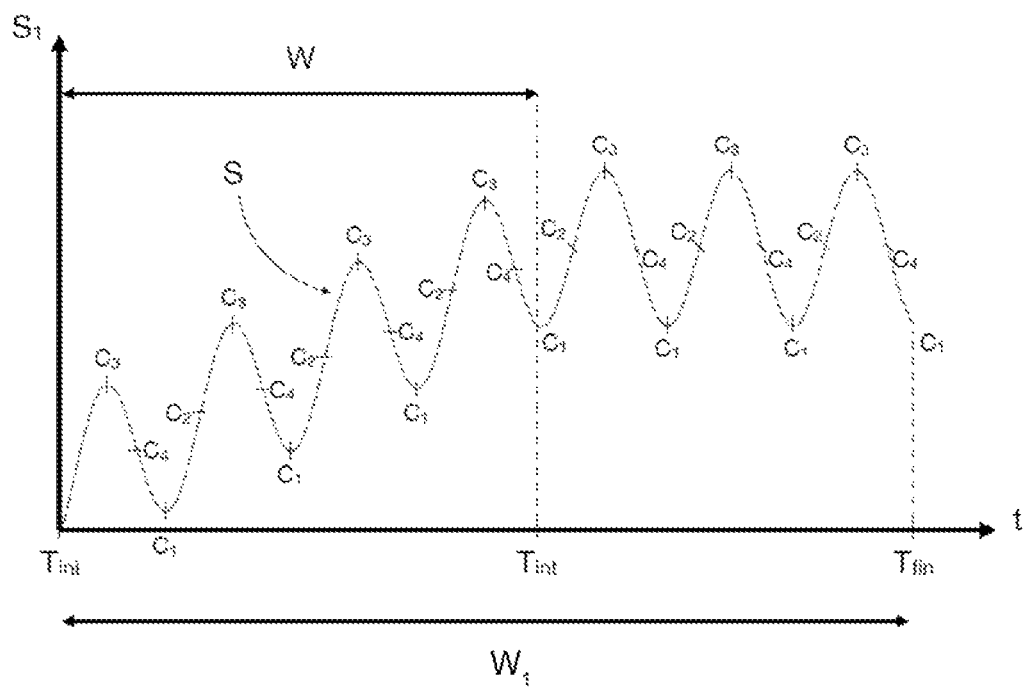
FIG. 3: is a curve representing one example of a signal S acquired by the radial acceleration sensor during a time window W.

FIG. 3 is a curve representing one example of a signal $S_1$ acquired by the radial acceleration sensor 14 during a time window Wi. In the example of FIG. 3, the signal $S_1$ is represented in a diagram which, on the abscissa axis, indicates the time measured in seconds, and on the ordinate axis indicates the value of the radial acceleration, measured in m·s$^{-2}$. Acquisition of the signal $S_1$ begins at an instant $T_{int}$ considered here, arbitrarily and entirely nonlimitingly, as being the time origin of the diagram. The final acquisition instant is denoted $T_{fin}$, such that the time window Wi corresponds to the interval $[T_{int},T_{fin}]$. In this example, the signal $S_1$ comprises first of all a first phase corresponding to a movement of the vehicle at a non-steady speed (or, and this is equivalent, at a variable speed), from the initial instant $T_{int}$ as far as an intermediate instant $T_{int}$. During this first phase, the vehicle is running at a speed for which the mean component $A_M$ of the radial acceleration is increasing, which means that its speed is increasing. From $T_{int}$ onward, and up to $T_{fin}$, the signal $S_1$ comprises a second phase corresponding to the vehicle moving at a steady speed. During this second phase, the mean component $\Delta M$ of the radial acceleration and the longitudinal component $A_L$ are respectively constant and zero, such that the vehicle is running at constant speed. Furthermore, the points $C_1$, $C_2$, $C_3$ and $C_4$, which correspond to said extremal positions, are indicated periodically in FIG. 3, according to the revolutions performed by the wheel 10.

It should be noted that FIG. 3 illustrates, in general terms, the appearance of a signal acquired by the radial acceleration sensor 14. It is nevertheless clear from the description of FIG. 3 that the signal S referred to in the acquisition step 100 corresponds, for example, with reference to FIG. 3, to that part of the signal $S_1$ that is comprised in the interval $[T_{ini},T_{int}]$, this interval then corresponding to said time window W.

It will therefore be appreciated that a signal acquired by the radial acceleration sensor 14, although always exhibiting fluctuations about the mean component $\Delta M$, may comprise one or more phases of, respectively, steady speed or non-steady speed (corresponding to an increase or alternatively to a decrease in the speed of the vehicle), and these may occur in any order. This is why the signal S in step 100 thus refers either to a signal acquired during a time window specifically configured to limit the acquisition to a phase of non-steady speed of the vehicle, or to a part of a signal comprising several phases of vehicle running conditions of which at least one is a phase of non-steady speed.

The next part of the description adopts the convention whereby the vehicle is configured to run at a speed of between 20 km/h and 150 km/h. Such a speed range corresponds to a frequency of rotation of the wheel 10 of between 3 Hz and 25 Hz. As a result, the time window W is chosen so as to allow the acquisition of a signal S for a duration suitable for detecting local extrema, as described hereinafter. For example, the duration of the time window W is between 80 ms and 700 ms. However, there is nothing to prevent the duration of the time window W, in other examples not detailed here, from being chosen outside of the interval [80 ms, 700 ms], it being within the competence of the person skilled in the art to parameterize such a duration according to the range of speeds of the vehicle.

Note that the acquisition step 100 is conditional upon the vehicle being in motion at a non-steady speed. In one exemplary embodiment, the acquisition step 100 is executed just once per driving cycle. The expression "driving cycle" refers here to a cycle beginning, for example, once the vehicle has been driving for at least one minute at a speed greater than 20 km/h and ending, for example, once the vehicle has been stationary for at least 15 minutes. However, there is nothing to prevent a driving cycle being defined, in other embodiments not detailed here, by other parameters. Alternatively, the step 100 is executed for example periodically after a predetermined number of driving cycles, for example every five driving cycles.

The method then comprises a detection step 200 of detecting at least three local extrema of the signal S.

In one particular embodiment, the detection of the local extrema within the time window W involves first of all sampling the signal S at a predetermined frequency. For example, the signal S is sampled at a frequency greater than 500 Hz, for example equal to 2 kHz. However, there is nothing to prevent sampling, in other embodiments not detailed here, at a frequency greater than 2 kHz. To this end, it is within the competence of a person skilled in the art to implement the electronics necessary for sampling at a desired frequency, within the design and cost limitations prescribed by the technical specifications of the manufacturer of the wheel unit 11.

Note that the expression "local extremum" refers here to the fact that the criterion of representing a maximum (or else a minimum) that a sample of a signal has to meet in order for this sample to be considered to be an "extremum" is defined in relation to a detection window around said sample.

For example, a detection window for a given sample is defined as being the set encompassing the five samples preceding said given sample, as well as the five samples succeeding said given sample. It is within the competence of a person skilled in the art to choose a suitable size of detection window to be considered, so as to ensure precise detection of the local extrema of a signal.

As a preference, the sampled signal S is then filtered in order to remove the measurement aberrations caused, for example, by poor conditions of driving of the vehicle. Filtering the signal S in this way makes it possible to avoid detecting local extrema amongst the noise that might be affecting the measurements from the radial acceleration sensor 14. For example, a low-pass filter is applied to the signal S, the cut-off frequency of said filter preferably being equal to 200 Hz. However, there is nothing to prevent other types of filter with different cut-off frequencies being applied, depending on the information that is to be sought out and isolated in the signal S.

Once the signal S has been sampled, and, where appropriate, filtered, the local extrema are detected in a way known per se, for example using a sliding detection window perusing the associated time window W. In other words, this is a matter of perusing the time series of the samples and of detecting the local extrema therein.

As described above, the signal S fluctuates about its mean component $A_M$. It will be appreciated therefore that the local extrema of the signal S correspond to the radial acceleration values acquired at the extremal positions $C_1$ and $C_3$, namely when the gravitational component $A_G$ of the radial acceleration is at a maximum in terms of absolute value. Thus, in the present exemplary embodiment, the local extrema of the signal S are respectively associated with detection instants corresponding to the instants at which the radial acceleration sensor 14 occupies either a position $C_1$, or a position $C_3$. These detection instants are also stored in memory by the memory storage means of the wheel unit 11 while waiting to be processed during later steps of the method.

In addition, said local extrema are also respectively associated with phase values corresponding to the values of phases of said positions $C_1$ and $C_3$. In other words, the difference between the respective phases of two consecutive local extrema of the signal S is equal to n. More generally, the difference between the respective phases of any two extremal positions $C_1$ and $C_3$ of the signal S is a multiple of n.

The next part of the description adopts the convention whereby, for one revolution of a wheel 10, the phase values of the local extrema corresponding to the extremal positions $C_1$, $C_2$, $C_3$ and $C_4$ are respectively equal to 0, n/2, n, 3×n/2. After one revolution of a wheel 10, the phase value for a local extremum corresponding to the position $C_1$ is equal to 2×n (also denoted "2n"), etc.

It is important to note that the act of seeking the local extrema of the signal S rather than considering other samples at random is advantageous because it allows them to be characterized reliably via their respective detection instants and phase values. Specifically, the local extrema of the signal S correspond to the only samples for which it is possible to attribute a known respective phase value. Away from these local extrema, it is not possible to determine the phase value of a sample.

Thus, at the end of step 200, each local extremum of the signal S is associated with a phase value and with an instant of detection within the time window W.

Following on from the step 200, the method comprises a determination step 300 of determining, for the relevant time window W, a variation in frequency F' of rotation of the wheel 10 of the vehicle as a function of said phase values and of said detection instants.

Adopting this approach for determining the variation in frequency F' is particularly advantageous because it makes it possible to obtain a very precise value which takes account of the dynamics of the wheel 10, and to do so when the vehicle is moving at a non-steady speed.

In one particular embodiment, a phase time signal $\varphi$ is determined by quadratic interpolation of the respective phase values of three local extrema detected during the step 200. Said time signal $\varphi$ therefore corresponds, from a mathematical viewpoint, to a continuous function of which the argument is time.

As an entirely nonlimiting illustration of an example of quadratic interpolation, consider, within the time window W, three local extrema, respectively associated with the phase values 0, n and 2n. These phase values correspond respectively to the detection instants denoted $t_0$, $t_1$ and $t_2$. The phase signal $\varphi$ is sought in the form:

$$\varphi(t) = A \times (t-t_0)^2 + B \times (t-t_0),$$

where A and B are constants. The constants A and B are determined in the conventional way by solving a system of two equations with two unknowns. This system can be written:

$$\varphi(t_1) = n, \text{ and } \varphi(t_2) = 2n,$$

yielding respectively:

$$A = \pi \times \frac{2 - \frac{t_2 - t_0}{t_1 - t_0}}{t_1 \times t_2 \times \left(\frac{t_2 - t_0}{t_1 - t_0} - 1\right)} \text{ and } = \pi \times \frac{(t_2 - t_0)^2 - 2 \times (t_1 - t_0)^2}{t_1 \times t_2 \times (t_2 - t_1)}.$$

Using these calculations, it may be seen that when the duration $t_2 - t_0$ is equal to twice the duration $t_1 - t_0$, the coefficient A is zero. That corresponds to the situation in which the signal S, from which the local extrema are extracted, is a sinusoid, namely that the vehicle is traveling at a constant speed and that the phase signal is an affine function of time.

By contrast, when the duration $t_2 - t_0$ is not equal to twice the duration $t_1 - t_0$, namely when the vehicle is traveling at a variable speed, it will then be appreciated that seeking a quadratic interpolation of the phase advantageously allows a more refined estimate of how the phase signal $\varphi$ changes with respect to time. Specifically, in this type of condition, the change in phase signal $\varphi$ with respect to time is no longer linear.

As a result, one advantage associated with the fact of performing a quadratic interpolation of the local extrema detected in a time window W is that it makes it possible to obtain a phase signal $\varphi$ representative of any type of speed of travel of the vehicle, and therefore in particular during a non-steady speed as is the case in the context of an aspect of the present invention.

It will also be noted that determining the phase signal $\varphi$ according to this embodiment requires very little calculation, and can therefore be executed very quickly. Specifically, said quadratic interpolation is determined by the calculation of said coefficients A and B. Now, these calculations are based solely on algebraic operations using the detection instants, more specifically the durations $t_1 - t_0$ and $t_2 - t_0$. Therefore the execution of this type of calculation does not require the wheel unit 11 to have a complex electronic architecture, and this simplifies the design of said unit.

The form in which the phase signal φ is sought, which is the form indicated hereinabove, corresponds to a configuration in which the phase of the signal S acquired in the time window W is considered to be zero at the instant to. This then is a convention adopted in order to simplify the description of an aspect of the present invention. Thus, there is nothing to prevent having, in other embodiments not detailed here, a local extremum associated with a detection instant to and for which the value of the phase is a multiple of n. In that case, it is within the competence of a person skilled in the art to determine the form in which to seek said quadratic interpolation.

It will also be noted that, in order to implement said particular embodiment, the local extrema of the time window considered are consecutive. Adopting that approach advantageously makes it possible to interpolate phase values that are not very widely spaced in time, namely that are obtained from a restricted number of revolutions of the wheel 10, for example typically two revolutions of the wheel 10. In this way, it is possible to obtain a phase signal quickly, without having to wait for numerous revolutions of the wheel 10, this being something that is better suited to determining a frequency representative of the non-steady speed at which the vehicle is traveling.

However, according to other embodiments, there is nothing to prevent a phase time signal φ from being determined by quadratic interpolation of non-consecutive local extrema. Insofar as the interpolation sought is a degree two polynomial function, the only condition imposed is that of having three interpolation (and namely therefore three extrema) values available. In general, whatever the local extrema considered, one example of quadratic interpolation is to determine the Lagrange polynomial that passes through these local extrema.

In addition, the inventors have found that seeking the phase signal φ in the form of a degree two polynomial function made it possible to obtain a good approximation, and therefore sufficient precision for determining a variation in frequency F' associated with the time window. However, there is nothing to prevent the phase signal φ from being determined by means of a polynomial regression of degree higher than two, or else again by means of a piecewise polynomial function interpolation, for example using splines.

Once the phase signal φ has been determined for the time window W, said variation in frequency F' is determined in its turn by evaluating the second derivative of said signal φ.

For example, when the phase signal φ is determined by quadratic interpolation in the form:

$$\varphi(t) = A \times (t - t_0)^2 + B \times (t - t_0),$$

the frequency F is given by the formula:

$$F = \frac{1}{2\pi} \times \frac{d\varphi(t)}{dt}(t) = \frac{1}{\pi} \times \left[ A \times (t - t_0) + \frac{B}{2} \right].$$

It then follows that the variation in frequency F' satisfies:

$$F' = \frac{1}{2\pi} \times \frac{d^2\varphi(t)}{dt^2} = \frac{A}{\pi}$$

Therefore, the act of determining the phase signal φ more precisely (by comparison with a simple linear approximation) makes it possible to obtain a very precise value for the variation in frequency F' of rotation of the wheel 10. It will also be appreciated that the act of performing a quadratic interpolation of three extrema in order to obtain the phase signal φ allows a simple and very rapid determination of F', which is then constant. In addition, it will be noted that while this variation in frequency is determined here in the context of a vehicle traveling at a non-steady speed, the calculations employed are still applicable to any type of speed-of-travel conditions of said vehicle.

It will be noted that if the phase signal φ is determined in the form of a polynomial of degree strictly higher than 2, the second derivative of the phase signal φ is not constant but a numerical function that varies with time. In that case, the convention adopted is that whereby the variation in frequency F' corresponds to the evaluation of the derivative of the signal φ at a predetermined instant $t_p$ within the time window W. Such an instant $t_p$ does not necessarily correspond to an instant of detection of a local extremum within said window W. For example, said instant $t_p$ is equal to an instant marking the start (or else an instant marking the end) of the window W. However, there is nothing to prevent consideration of any arbitrary instant $t_p$ within the window W for evaluating the phase signal φ and therefore also the variation in frequency F'.

The method next comprises a determination step 400 of determining, for at least one detection instant, a discrepancy between the local extremum associated with said at least one detection instant and a reference signal obtained by eliminating the fluctuations in the signal S, so that said reference signal is indicative of the central acceleration of the wheel 10 during said time window W.

Figure 4:
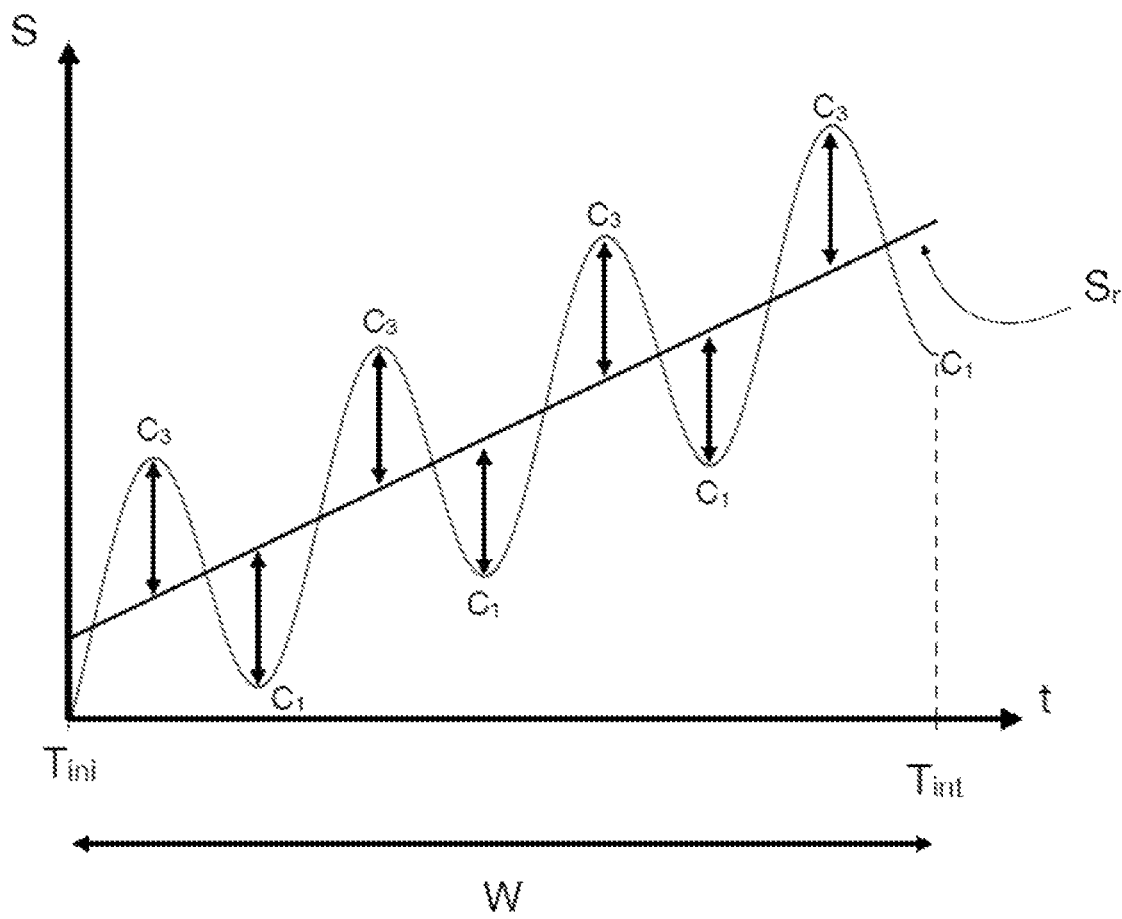
FIG. 4: is a depiction of a restriction of the curve of FIG. 3 corresponding to movement of the vehicle under non-steady-state conditions.

FIG. 4 is a depiction of a restriction of the curve of FIG. 3 to the interval $[T_{ini}, T_{int}]$, and corresponding to the movement of the vehicle under non-steady-state conditions.

Note first of all that what is meant here by "by eliminating the fluctuations" is the act of obtaining an estimate of the mean component $A_M$ of the signal S that is truly representative of the central acceleration of the wheel 10. For example, when the signal S acquired is sampled at a predetermined frequency, said reference signal is obtained by linear regression of said samples of the signal S. A linear regression allows an estimate of the mean component $A_M$ of the signal S to be obtained rapidly without the need to employ complex electronics. Such a reference signal obtained by linear regression is illustrated for example in FIG. 4 and denoted $S_r$.

However, there is nothing to prevent the reference signal from being determined in a different way, for example by filtering the signal S using a low-pass filter. In that case, the cut-off frequency of the low-pass filter applied is, for example, less than or equal to 10 Hz, preferably less than 5 Hz, and more preferably still less than 1 Hz. The choice of a particular value for said cut-off frequency conventionally depends on the trade-off between the desired precision and the associated operating cost (this cost being linked in with the complexity of the electronics carried on board the wheel unit 11).

A discrepancy, at the detection instant associated with it, quantifies the contribution made by the gravitational component $A_G$ and the longitudinal component $A_L$ to the radial acceleration. Insofar as the gravitational acceleration vector and the longitudinal acceleration vector are, by definition, mutually orthogonal at every instant, the measurement of such a discrepancy at the associated detection instant equates to:

$$E_G \times \sqrt{A_L^2 + g^2}$$

where $E_G$ corresponds to an error in the gain of the radial acceleration sensor 14. For example, and as illustrated in FIG. 4, a discrepancy between a local extremum associated with an extremal position $C_1$ or $C_3$ and the reference signal $S_r$ is measured vertically, namely parallel to the ordinate axis. Said discrepancies are illustrated in FIG. 4 by lines with arrowheads at both ends.

For the remainder of the description and unless indicated otherwise, the gain error $E_G$ is considered to be unity. An embodiment alternative in which this gain error is determined more precisely is set out later.

In one preferred embodiment, a plurality of detection instants are considered, so as to obtain a plurality of discrepancies respectively associated with said detection instants. Adopting this approach makes it possible to gather more information regarding how the longitudinal component $A_L$ of the radial acceleration evolves and, ultimately, as explained hereinafter in greater detail, makes it possible to determine with precision a value for the longitudinal component $A_L$. More preferably still, all the detection instants determined during the detection step 200 are considered for determining the discrepancies.

However, an aspect of the invention is not restricted to determining a plurality of discrepancies. Specifically, there is nothing to prevent consideration of just one single detection instant within the time window W, in order to calculate one single discrepancy. Typically, the choice for determining the number of discrepancies to be calculated is dependent on the level of precision sought for evaluating the longitudinal component $A_L$ and also on the storage capacity of the memory storage means of the wheel unit 11.

The method next comprises a determination step 500 of determining a value for the longitudinal acceleration $V_{al}$ of the vehicle for the relevant time window W as a function of said at least one discrepancy.

In one particular embodiment, when a plurality of detection instants are considered, so as to obtain a plurality of discrepancies respectively associated with said detection instants, the longitudinal acceleration value $V_{al}$ is calculated using the formula:

$$V_{al} = \sqrt{\Delta M^2 - g^2}$$

where $\Delta M$ is a quantity indicative of a mean of the respective absolute values of said discrepancies. More preferably still, all the detection instants are considered.

For example, the quantity $\Delta M$ is equal to the ratio between the arithmetic mean of said absolute values and an error $E_G$ in the gain of the radial acceleration sensor 14. It will therefore be appreciated, with regard to the formulae given hereinabove for measuring a discrepancy, that by expressing the coefficient $\Delta M$ in this way, that equates to estimating a value approximating to the longitudinal acceleration of the vehicle across the entire time window W.

It should be noted that the act of considering the discrepancies in terms of absolute values makes it possible to eliminate the effect of any convention that might be chosen regarding how said discrepancies are measured. Typically, if the discrepancies are measured algebraically with respect to the mean component of the acceleration of the vehicle, then they alternate between positive discrepancies and negative discrepancies.

However, there is nothing to prevent the quantity $\Delta M$ from being calculated in a different way, provided that it remains representative of the discrepancies measured during step 400. For example, other types of mean are conceivable, such as a geometric mean, a quadratic mean, etc.

Neither is there anything to prevent for each detection instant, and as a function of the discrepancy measured during in detection step 400, the determination of the value of the associated longitudinal component $A_L$ and then the calculation of a mean, for example an arithmetic mean, of said longitudinal component values.

Finally, the method comprises an estimation step 600 of estimating said external radius $R_e$ as a function of said longitudinal acceleration value $V_{al}$ and of said variation in frequency F'.

In the known way, the vehicle speed is equal to the product of the external radius $R_e$ of the tire multiplied by the angular velocity co. Said angular velocity co is itself equal to the product of the frequency of rotation of the wheel 10 times the quantity 2n. Therefore, the derivative with respect to time of the speed of the vehicle, and which corresponds to the longitudinal acceleration of said vehicle, can be expressed as the products with respect to one another of the external radius $R_e$, of said quantity 2n, and of the derivative with respect to time of the frequency of rotation of the wheel 10.

Therefore, in one preferred embodiment, the external radius $R_e$ is calculated using the formula:

$$R_e = \frac{V_{al}}{2 \times \pi \times F'}$$

Such calculation advantageously allows the external radius $R_e$ of the tire 13 to be determined with great precision. Such precision is the result, on the one hand, of the way in which the variation in frequency F' is determined during step 300, and on the other hand, of the way in which the acceleration value $V_{al}$ is determined during step 500. Furthermore, it should be noted that such calculation does not require any direct measurement of geometric parameters of said tire 13. As a result, the wheel unit 11 determines said external radius $R_e$ autonomously, and this makes a favorable contribution toward simplifying the electronics carried on board the vehicle by comparison with the solutions hitherto known. In addition, the precision achieved in the calculation of the external radius $R_e$ has a direct impact on the precision with which the state of wear of the tire 13 is estimated.

It should be noted that, hitherto, the method according to an aspect of the invention has been described in such a way that steps 100 to 500 are executed once per driving cycle, or even potentially periodically after a predetermined number of driving cycles. Such an implementation is nonlimiting. Thus, according to yet another alternative, once the acquisition step 100 has been performed, steps 200 to 500 are iterated during the course of the relevant driving cycle. That approach allows the estimate of the external radius $R_e$ to be updated more regularly. For this purpose, the detection of extrema is for example implemented in several sub-windows of the time window W, the external radius $R_e$ then being estimated for each of said sub-windows. Said sub-windows correspond for example to the sliding of a first sub-window.

Figure 5:
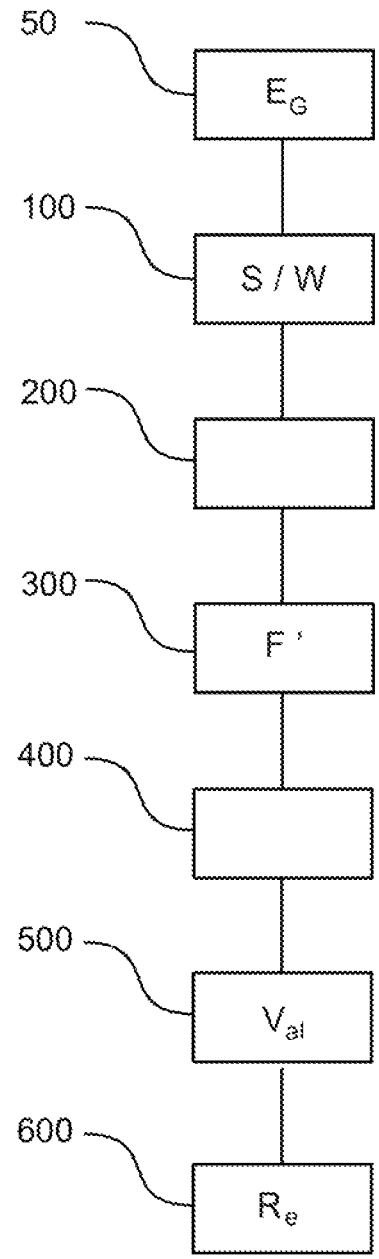
FIG. 5: is a flow diagram of one preferred embodiment of the method of FIG. 2 in which an error in the gain of the radial acceleration sensor is determined.

FIG. 5 depicts a flow diagram of a preferred embodiment of the estimation method of FIG. 2 and in which the gain error $E_G$ is determined prior to the acquisition step 100. As a result, in this preferred embodiment, the gain error is not fixed at unity.

It is known that the gain error $E_G$ (also known as the scaling error) corresponds to the error in the slope of the characteristic curve of the radial acceleration sensor 14. In other words, it is the difference between the signal measured by the radial acceleration sensor 14 and a theoretically expected signal. Also, with a view to improving the precision of the measurements taken by the radial acceleration sensor 14, it is appropriate to be able to estimate said gain error. Specifically, it is found that the current tolerance to design errors of a radial acceleration sensor 14 is becoming increasingly low, given that measurement precision is becoming increasingly critical for achieving the complex functions of the vehicle monitoring system, such as, for example, reliably locating a particular wheel that is experiencing a loss of pressure. Estimating an error in the gain of the radial acceleration sensor 14 then makes it possible, in a way that compliments the determination of the variation in the frequency of rotation of the wheel 10, to increase the precision with which the longitudinal component $A_L$ and therefore ultimately the external radius $R_e$ of the tire 13, is determined.

As illustrated in FIG. 5, said gain error $E_G$ is preferably determined during a step 50 that precedes the acquisition step 100. For example, for a time window $W_a$ earlier than the time window W, a radial acceleration signal $S_a$ is acquired earlier than the signal 5, and an error $E_G$ in the gain of the radial acceleration sensor 14 is estimated using the formula:

$$E_G = V_G / Q_G,$$

where $V_G$ represents an amplitude associated with at least one local extremum of this earlier signal $S_a$, and $Q_G$ represents an amplitude that is expected on the basis of measurements theoretically supplied by the radial acceleration sensor 14 for said at least one local extremum, the gain error $E_G$ being calculated only if a steady-speed phase is detected for this earlier signal Sai.

The condition stipulating that the gain error $E_G$ be calculated only if a steady-speed phase is detected in said earlier time window $W_a$ is fundamentally associated with the fact that the profile of said earlier signal $S_a$ is sinusoidal during such a steady-speed phase. In other words, the longitudinal component of the radial acceleration is zero.

For example, once the earlier signal $S_a$ has been acquired, a phase time signal (pa referred to as an earlier signal is determined through a procedure identical to that described hereinabove in respect of the signal φ, for example by quadratic interpolation. The second derivative of this earlier phase signal $φ_a$ is then compared with a predetermined value ε, such that if $$|d^2 φ_a / dt^2| < ε,$$

a steady-speed phase is detected.

As a preference, the predetermined value s is chosen from the interval [0.5, 1], for example equal to 0.6. The lower the chosen value s, namely the closer it is to zero, the greater the equivalence between the condition to be met in order to detect a steady-speed phase and checking that the profile of the earlier signal $S_a$ is sinusoidal, namely that the frequency of rotation of the wheel 10, during the course of the earlier window $W_a$, is constant. Specifically, with reference for example to the analytical expression for $φ_a$ in the case of quadratic interpolation, it is found that as the value s tends toward 0, the condition for detecting a steady-speed phase becomes equivalent to determining whether the duration $t_2 - t_1$ is tending toward becoming equal to the duration $t_1 - t_0$. However, there is nothing to prevent the value of s being chosen from another interval the upper and lower limits of which are respectively greater than 0.5 and 1. The choice of the limits on said interval is dependent on the limit value for the longitudinal component of the radial acceleration that has been set in order to decide whether the vehicle is in a steady speed phase.

The fact that the gain error $E_G$ associated with a time window $W_a$ is calculated only if a steady-speed phase is detected for the signal $S_a$ advantageously allows a measured amplitude to be compared against a theoretical amplitude for said signal $S_a$.

In one preferred embodiment, the amplitude $V_G$ corresponds to the amplitude between two consecutive local extrema of the signal $S_a$ in a steady-speed phase, and $Q_G$ satisfies:

$$Q_G = 2 \times g \times G,$$

where G represents the gain of a filter applied to the signal $S_a$ so as to reduce measurement noise. Such a gain G is a known and predetermined data item.

In other words, in this example it is a matter of comparing $V_G$, which corresponds to the peak-to-peak amplitude of the signal $S_a$, with the corresponding amplitude theoretically expected on the basis of knowledge of the gain G. The analytical expression for $Q_G$ is justified by the fact that the signal $S_a$ fluctuates about its mean component with an amplitude of between +g and -g, and modulated by the gain of the applied filter. The fact that $V_G$ corresponds to a peak-to-peak amplitude is advantageous because $V_G$ is then dependent solely on the gain error.

However, there is nothing to prevent a gain error $E_G$ being calculated with other values of $V_G$ and $Q_G$. For example, according to another exemplary embodiment, $V_G$ represents an amplitude between a local extremum of the signal $S_a$ and the mean component of said signal $S_a$. $Q_G$ then satisfies:

$$Q_G = g \times G.$$

Nevertheless, it should be noted that in this other example, the amplitude $V_G$ is dependent not only on the gain error but also on the way in which the mean component of the signal $S_a$ is determined.

However, there is nothing to prevent the gain error $E_G$ of the radial acceleration sensor 14 from being considered, in another alternative embodiment, for example when no steady-speed phase is detected prior to the detection step 100 of the estimation method, to take the value of unity. Considering a gain error $E_G$ with the value of unity makes it possible to simplify the calculations and therefore lessen the task of the wheel unit 11. That being the case, adopting this approach also results in a reduction in the precision with which the longitudinal acceleration component is determined. Nevertheless, even when considering a gain error of unity, the precision achieved in determining the longitudinal acceleration component remains highly satisfactory.

In general, it should be noted that the embodiments considered hereinabove have been described by way of nonlimiting examples, and that other variants are therefore conceivable.

In particular, an aspect of the invention has been described considering the wheel unit 11 to operate advantageously in an autonomous manner, namely without requiring intervention on the part of an external operator, and for this purpose to comprise means suited to implementing each of the steps of the method for determining the position of the radial acceleration sensor 14. However, there is nothing to prevent all or some of said steps, apart from the acquisition step 100, from being performed by the central unit with which the motor vehicle is equipped, or else again for example by computers positioned at a fixed station external to the vehicle, used by one or more operators, and to which data (acquired signals, etc.) would be transmitted in the form of radio electric signals.

The invention claimed is:

1. A method for estimating the external radius $R_e$ of a tire fitted to a wheel of a motor vehicle, said wheel comprising a radial acceleration sensor, said method comprising:
   an acquisition step of acquisition, by the radial acceleration sensor, of a signal S during a predetermined time window W when the vehicle is in motion under non-steady-state conditions,
   a detection step of detecting at least three local extrema of the signal S which are respectively associated with phase values and with detection instants,
   a determination step of determining, for the relevant time window W, a variation in frequency F' of rotation of the wheel of the vehicle as a function of said phase values and of said detection instants,
   a determination step of determining, for at least one detection instant, a discrepancy between the local extremum associated with said at least one detection instant and a reference signal obtained by eliminating the fluctuations in the signal S, so that said reference signal is indicative of the central acceleration of the wheel during said time window W,
   a determination step of determining a value for the longitudinal acceleration $V_{al}$ of the vehicle for the relevant time window W as a function of said at least one discrepancy, and
   an estimation step of estimating said external radius $R_e$ as a function of said longitudinal acceleration value $A_L$ and of said variation in frequency F'.

2. The estimation method as claimed in claim 1, wherein the step of determining the variation in frequency F' comprises determining a phase time signal $\varphi$ by quadratic interpolation of the respective phase values of three local extrema, said variation in frequency F' being determined by evaluating the second derivative of said signal $\varphi$.

3. The method as claimed in claim 2, wherein the three local extrema considered within the time window W are consecutive.

4. The method as claimed in claim 1, wherein the signal S acquired is sampled at a predetermined frequency, and wherein said reference signal is obtained, during the step of determining the discrepancies, by linear regression of said samples of the signal S.

5. The method as claimed in claim 1, wherein a plurality of detection instants are considered during the step of determining the discrepancy, so as to obtain a plurality of discrepancies respectively associated with said detection instants, said longitudinal acceleration value $V_{al}$ being calculated using the formula:

$$V_{al} = \sqrt{\Delta M^2 - g^2}$$

where $\Delta M$ is a quantity indicative of a mean of the respective absolute values of said discrepancies, and g is the acceleration due to gravity.

6. The method as claimed in claim 5, wherein all the detection instants determined during the detection step are considered during the step of determining the discrepancies.

7. The method as claimed in claim 5, wherein the quantity $\Delta M$ is equal to the ratio between the arithmetic mean of said absolute values and an error $E_G$ in the gain of the radial acceleration sensor, said gain error $E_G$ being determined prior to the acquisition step during a phase of steady-state running of the vehicle.

8. The method as claimed in claim 1, wherein the external radius $R_e$ is calculated using the formula:

$$R_e = \frac{V_{al}}{2 \times \pi \times F'}.$$

9. A wheel unit comprising a radial acceleration sensor, said wheel unit comprising means configured for implementing the steps of the estimation method as claimed in claim 1.

10. A motor vehicle comprising a wheel unit as claimed in claim 9.

* * * * *